(12) United States Patent
Machledt et al.

(10) Patent No.: US 7,475,515 B2
(45) Date of Patent: Jan. 13, 2009

(54) FLUSH TO GRADE UTILITIES VAULT

(76) Inventors: Charles G. Machledt, 6306 Winding Brook Dr., New Port Richey, FL (US) 34655; Fredric P. Machledt, 5202 N. New Jersey St., Indianapolis, IN (US) 46220

( * ) Notice: Subject to any disclaimer, the term of this patent is extended or adjusted under 35 U.S.C. 154(b) by 895 days.

(21) Appl. No.: 10/864,010

(22) Filed: Jun. 9, 2004

(65) Prior Publication Data

US 2005/0000175 A1 Jan. 6, 2005

Related U.S. Application Data

(63) Continuation-in-part of application No. 10/609,381, filed on Jul. 1, 2003, now Pat. No. 6,772,566.

(51) Int. Cl.
*H05K 5/00* (2006.01)
*H05K 5/02* (2006.01)

(52) U.S. Cl. .................. 52/169.7; 174/50; 220/4.02; 220/486; 220/500

(58) Field of Classification Search ............... 52/19–21, 52/79.1, 79.9, 79.14, 128, 169.1, 169.6, 169.7; 174/50, 61, 65 R, 50.5, 50.51; 220/3.2, 4.02, 220/484, 485, 500, 567.1; 361/600–603, 361/605, 625, 641, 679
See application file for complete search history.

(56) References Cited

U.S. PATENT DOCUMENTS

| | | | |
|---|---|---|---|
| 1,719,224 A | 7/1929 | Hasse | |
| 2,871,457 A | 1/1959 | Jencks et al. | |
| 3,263,853 A | 8/1966 | Smith | |
| 3,498,011 A | 3/1970 | Lindgren | |
| 3,809,969 A | 5/1974 | Williams et al. | |
| 4,005,253 A | 1/1977 | Walter | |
| 4,534,132 A * | 8/1985 | Smith | 49/386 |
| 4,771,910 A | 9/1988 | Roy | |
| 4,836,408 A | 6/1989 | Roy | |
| 4,840,285 A | 6/1989 | Carr | |
| 4,872,575 A | 10/1989 | Kobilan | |
| 4,961,293 A | 10/1990 | House et al. | |
| 5,249,697 A | 10/1993 | McKinnon | |
| 5,272,279 A * | 12/1993 | Filshie | 174/50 |
| 5,366,190 A * | 11/1994 | Schaefer et al. | 248/122.1 |
| 5,534,664 A | 7/1996 | Fearing, Jr. et al. | |
| 5,778,608 A * | 7/1998 | Elliott, Jr. | 52/79.9 |
| 5,791,098 A | 8/1998 | Thomas | |

(Continued)

*Primary Examiner*—Jeanette Chapman
(74) *Attorney, Agent, or Firm*—Paul Derek Pressley; William F. Bahret

(57) ABSTRACT

A flush to grade utilities vault is disclosed. The vault comprises a concrete box with a lockable, hinged fiberglass lid. The box has an appendage housing the locking mechanism external to the box. The lid is designed to achieve an ASTM A-16 load rating and has a domed skid resistant surface for use flush with a sidewalk. A floor platform lies above the bottom of the box such that utilities cables enter the box below the floor. A hinged utilities wiring frame is mounted inside opposite the lid hinge such that the frame hinges down in the box when the vault is closed and into a vertical position for making connections. A safety barrier is formed by the lid, the wiring frame, and barrier arms which hinge between them. A venting system provides egress for gasses and equalization of pressure between the interior and exterior of the vault.

23 Claims, 9 Drawing Sheets

U.S. PATENT DOCUMENTS

| | | | |
|---|---|---|---|
| 5,828,544 A | 10/1998 | Matsuda | |
| 5,864,091 A | 1/1999 | Sumida | |
| 5,939,669 A | 8/1999 | Finzel et al. | |
| 5,950,368 A * | 9/1999 | Bradford | 52/20 |
| 5,966,876 A * | 10/1999 | Neathery et al. | 52/20 |
| 6,006,944 A * | 12/1999 | Machledt | 220/567.1 |
| 6,016,828 A * | 1/2000 | Machledt | 137/202 |
| 6,164,369 A * | 12/2000 | Stoller | 165/104.33 |
| 6,173,733 B1 | 1/2001 | Pruitt et al. | |
| 6,207,894 B1 * | 3/2001 | Reiker | 174/503 |
| 6,229,707 B1 | 5/2001 | Keenan et al. | |
| 6,304,444 B1 * | 10/2001 | Combs et al. | 361/695 |
| 6,359,218 B1 | 3/2002 | Koch et al. | |
| 6,365,826 B1 | 4/2002 | Stendardo et al. | |
| 6,422,413 B1 | 7/2002 | Hall et al. | |
| 6,586,674 B2 * | 7/2003 | Krause et al. | 174/50.5 |
| 6,629,619 B2 * | 10/2003 | Sato et al. | 220/4.02 |
| 6,642,446 B2 * | 11/2003 | Dodds et al. | 174/50 |
| 6,772,566 B1 * | 8/2004 | Machledt et al. | 52/169.6 |
| 7,225,587 B2 * | 6/2007 | Shinehouse et al. | 52/19 |
| D548,204 S * | 8/2007 | Machledt et al. | D13/184 |

* cited by examiner

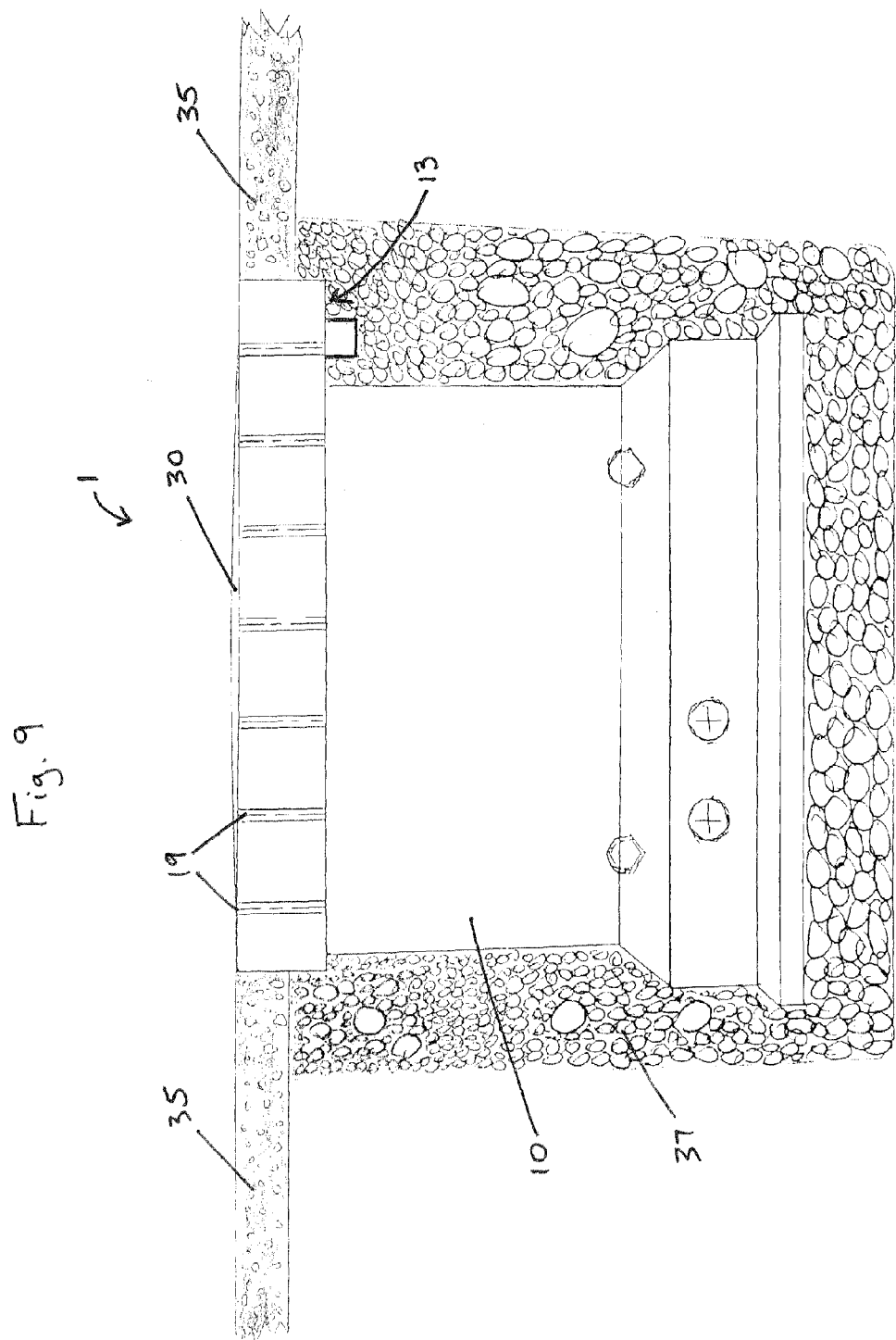

FLUSH TO GRADE UTILITIES VAULT

PRIOR HISTORY

This is a continuation-in-part application of application Ser. No. 10/609,381, filed Jul. 1, 2003 now U.S. Pat No. 6,772,566.

BACKGROUND OF THE INVENTION

1. Field of the Invention

The present invention relates to utilities vaults. More particularly, the invention comprises a vault, having an openable top which may be installed flush with a ground surface, providing a dry, secure chamber for housing utilities connections.

2. Description of the Prior Art

Subterranean chambers are frequently used for utilities connections, especially in urban areas, where above ground space is at a premium or there is a strong desire to maintain an aesthetically pleasing landscape. While the vaults are below ground level, it is desirable to maintain a dry environment which is conducive to maintaining the utilities connections in a good condition and acceptable working conditions for those who must install and service them.

U.S. Pat. No. 6,304,444 B1, issued to Charles D. Combs, et al., on Oct. 16, 2001, presents an UNDERGROUND CENTRALIZED POWER SUPPLY/BATTERY VAULT. An above ground unit having an intake fan and a discharge fan forces outside air to flow through a multi-chambered, partially submerged vault. A ducted, positive airflow is maintained such that air flows from the first chamber to the second chamber, preventing contaminated air from flowing form the second chamber to the first. With the exception of air ducts, the vault of Combs provides no ingress/egress for utilities, but rather provides a chamber for storage.

In U.S. Pat. No. 6,006,944, issued to Charles G. Machledt on Dec. 28, 1999, a BATTERY STORAGE VAULT is disclosed. An underground vault having a ground level, openable top is connected by a conduit to a separate equipment vault, thereby separating batteries and the associated gas fumes from the equipment. A separate ventilation system prevents fumes from migrating to the equipment vault.

U.S. Pat. No. 3,360,652, issued to Roy E. Uptegraff, Jr., on Dec. 26, 1967, discloses a TRANSFORMER HOUSING CONSTRUCTION. A vertical housing having a back, two side wall, and a front having a removable door cover is joined to a top and bottom such that a gap is formed between the vertical housing and the top and bottom. Airflow through the upper and lower gaps provides cooling to a transformer housed within the construction.

None of the above inventions and patents, taken either singly or in combination, is seen to describe the instant invention as claimed.

SUMMARY OF THE INVENTION

The present invention fulfills the need for a dry, secure, below grade housing for utilities connections, especially those utilities using wire type transmission lines, in an outdoor environment. In such application, it is desirable to have connection terminals which may be conveniently accessed without the need for working in cramped quarters, without requiring a large work area. The present invention provides a wiring frame which may be stored horizontally within a flush to grade grade vault, but hinged into a vertical, above grade, position, for making connections.

Accordingly, it is a principal object of the invention to provide a flush to grade utilities connections vault which may be easily installed in a flush to grade position.

It is another object of the invention to provide a flush to grade utilities connections vault which may be easily accessed for making utilities connections in a convenient working environment.

It is a further object of the invention to provide a flush to grade utilities connections vault which incorporates features to ensure public safety when in an open position.

Still another object of the invention is to provide a flush to grade utilities connections vault which is secure against unauthorized access and tampering.

An additional object of the invention is to provide a flush to grade utilities connections vault which has sufficient weight to resist the effects of ground water lift.

Yet another object of the invention is to provide a flush to grade utilities connections vault with an external stepped flair around the bottom thereof to help lock the vault in place by the weight of gravel/soil compacted thereabove.

It is again an object of the invention to provide a flush to grade utilities connections vault which is ventilated to ensure exit of gasses and equalization of pressure between the interior and exterior thereof.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

The flush to grade utilities vault generally comprises a concrete box or container for housing utilities underground with a fiberglass lid that sealedly covers an open side of the box.

The box has a flared base, a movable floor suspended above the bottom of the container providing a utilities chamber between the floor and the bottom of the container, a utility port through a wall of the container in communication with the utilities chamber, a utility mount for mounting a utility, and a vent system for venting gasses within the container. A step is mounted within the vault for aiding in descent into and ascent from the vault. A plurality of drain channels about the open side of the container directs fluids away from the open side of the container. A barrier panel adjacent the open side of the container prevents grade materials from entering the container during installation.

The lid is sized and shaped to cover the open side of the container and has a gasket positioned to provide a seal between the lid and the open side of the container when the lid is in a closed position. The lid has a domed exterior surface for directing fluids away from the lid. A piston mounted within the container and connected to the lid provides assistance in opening the lid. A locking system recessed within the lid secures the lid to the container. A safety barrier arm prevents closure of the lid when a wiring frame is hingedly swung into a vertical position opposite to the lid.

BRIEF DESCRIPTION OF THE DRAWINGS

Various other objects, features, and attendant advantages of the present invention will become more fully appreciated as the same becomes better understood when considered in conjunction with the accompanying drawings, in which like reference characters designate the same or similar parts throughout the several views, and wherein:

FIG. 9 illustrates the vault in an application where the vault is positioned flush with the grade of a sidewalk.

DETAILED DESCRIPTION OF THE PREFERRED EMBODIMENTS

Figure 1:
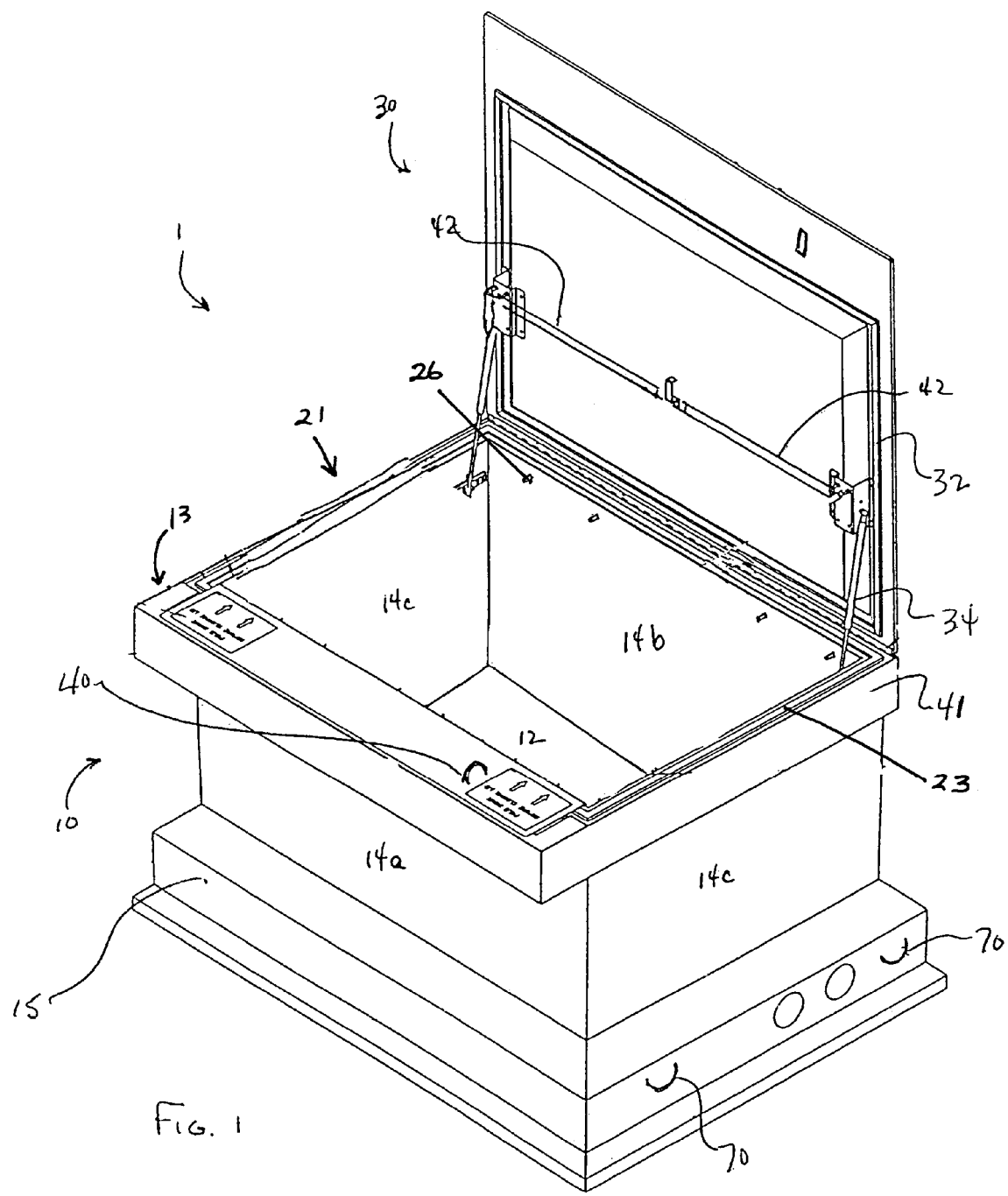
FIG. 1 is a front perspective view of the vault of the present invention with the lid open.
Figure 2:
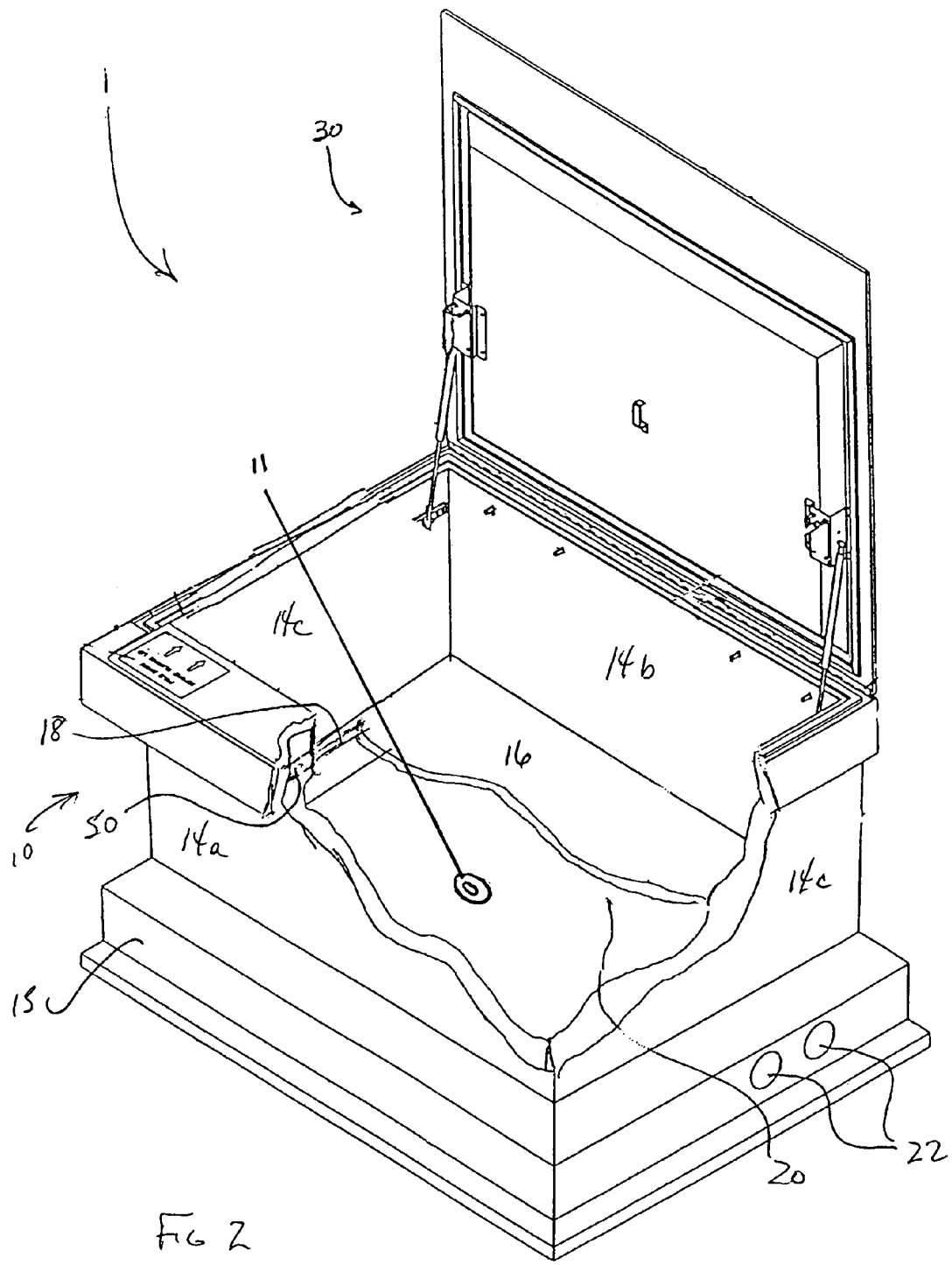
FIG. 2 is a partially cut away perspective view of the vault of the present invention showing the removable floor.
Figure 3:
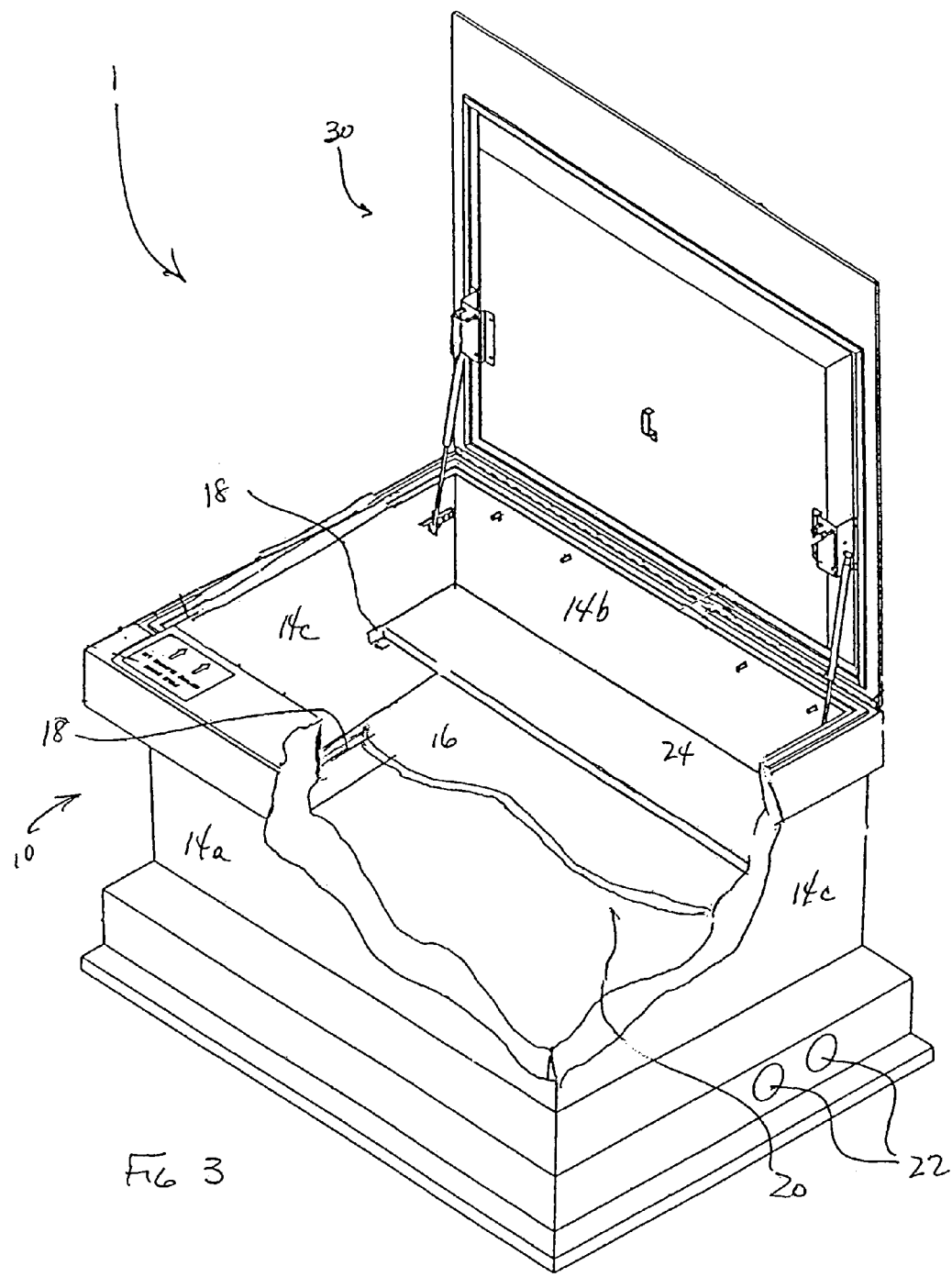
FIG. 3 is a partially cut away perspective view of the vault of the present invention showing the seat/step.
Figure 4:
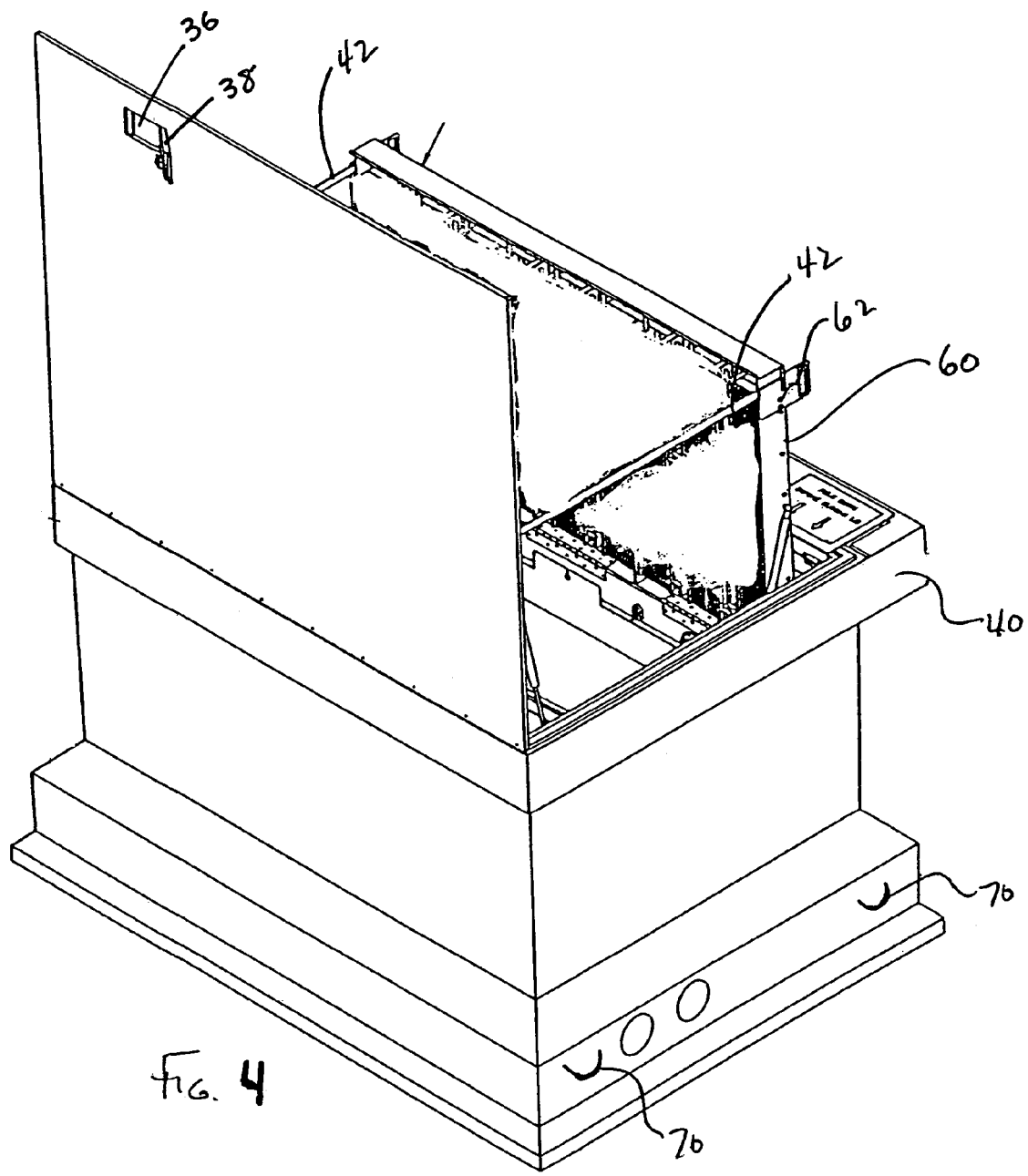
FIG. 4 is a rear perspective view of the open vault of the present invention showing the wiring frame in a raised position.

For the purposes of promoting an understanding of the principles of the invention, reference will now be made to the embodiments illustrated in the drawings and specific language will be used to describe same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring first to FIGS. 1 thru 4, the flush to grade utilities vault 1 of the present invention, in its' most simplistic elements, consists of a substantially rectilinear box 10 with a lid 30.

The box or container 10 has a bottom 12, a first wall 14a, a second, opposite wall 14b, and two end walls 14c, each wall 14 being substantially normal to each of the two adjacent walls 14 and to bottom 12. Box 10 is preferably formed of fiber reinforced concrete blended with a water proofing chemical, thereby providing weight substantial enough to prevent box 10 from floating in the event of rising ground water. It would be evident to one skilled in the art, however, that box 10 cold be formed of a variety of other materials, such as, but not limited to, fiberglass, which are resistant to the effects of ground contact, such as oxidation or other forms of deterioration, providing the vault 1, in its' entirety, is of sufficient weight to resist movement of the vault 1 due to shifts in the grade of the ground surrounding the vault 1. Movement of below grade objects due to ground heaves of this type is commonly called floating. The box 10 has a stepped flair 15 at the exterior base of each wall 14 providing additional resistance to vault 1 floating after gravel/soil is compacted thereabove and a one-way floor drain 11 to drain rainwater out of the box 10 while preventing backwater intrusion into the box 10.

Figure 6:
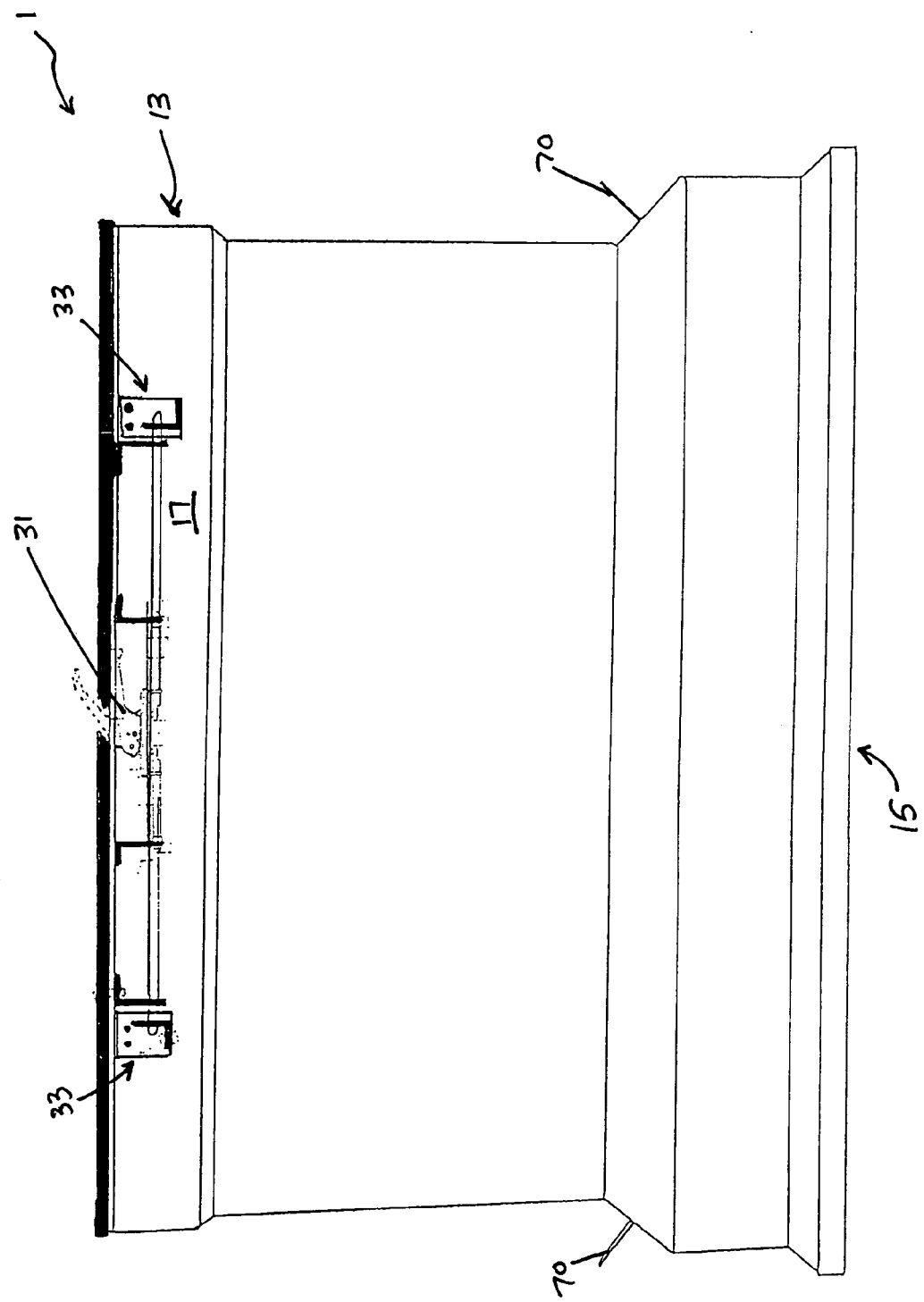
FIG. 6 is a partially cross-sectioned perspective view of the vault showing the vault hardware of the locking system.
Figure 7:
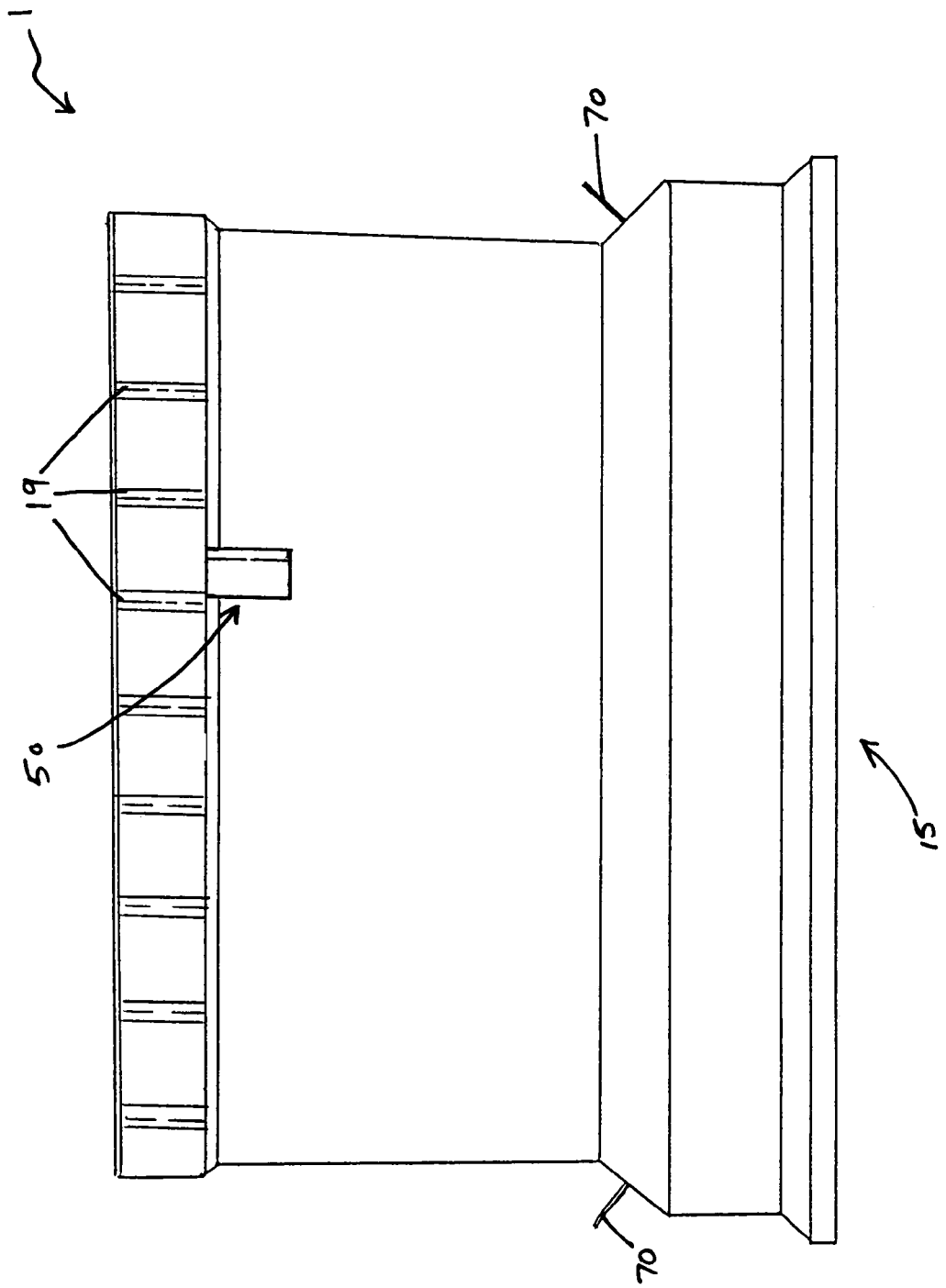
FIG. 7 is a front view of the vault with the perimetric frame removed to show the vertical drain channels.
Figure 8:
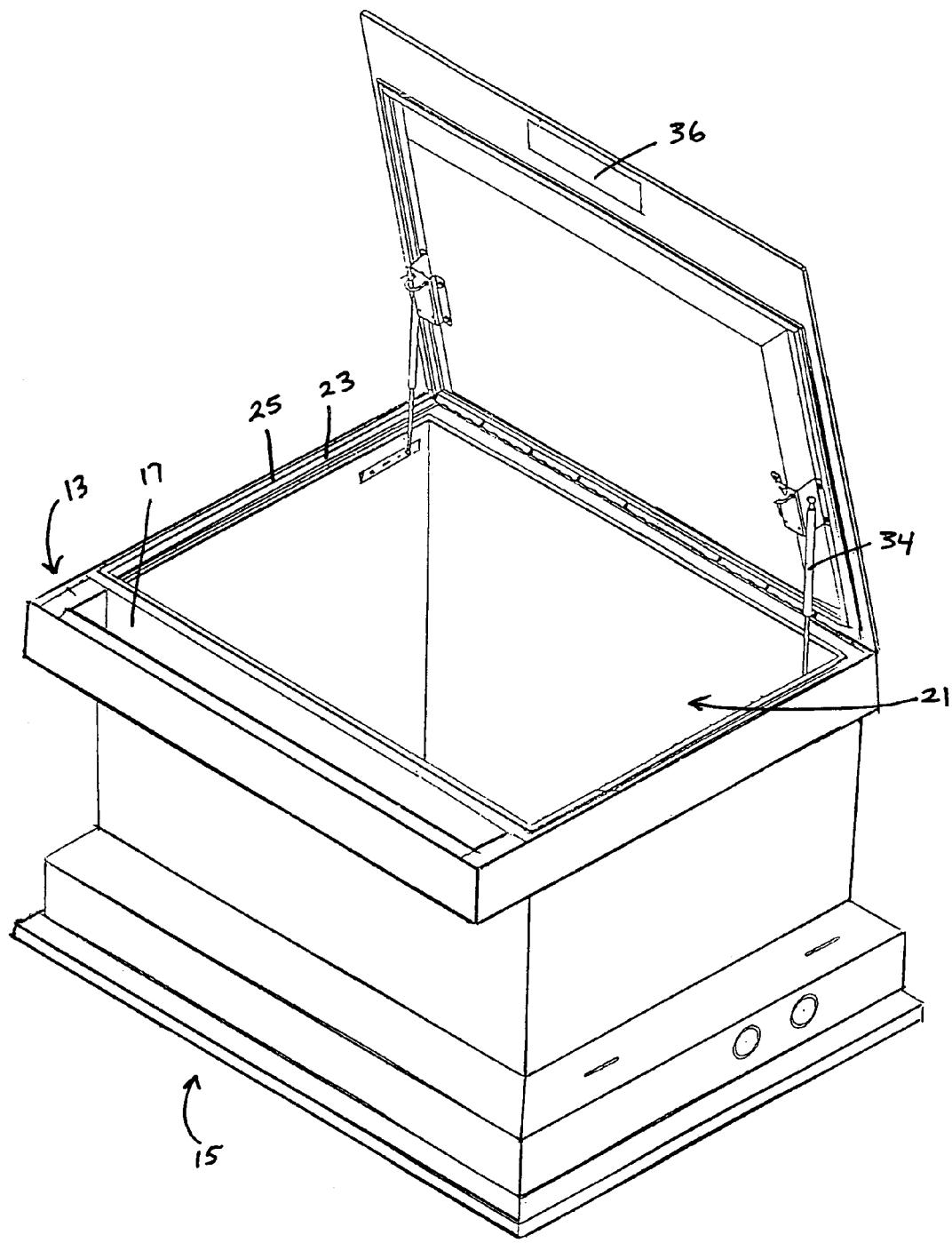
FIG. 8 is another perspective view of the vault showing an empty locking mechanism tray.

The box 10 has an external appendage 13 with a locking mechanism tray 17 for receiving a vault hardware type locking system as shown in FIGS. 6 and 8. The appendage 13 allows the locking system to be positioned outside the box 10 so that rainwater, soil and other grade material may not enter into the box 10 through locking system openings that would be placed in the box 10 if the locking system where placed inside of the box 10. A plurality of vertically oriented drain channels 19 are spaced about the open side 21 of the box 10 and appendage 13 as shown in FIGS. 7 and 9 that allow rainwater and other fluids running off the lid 30 to drain into gravel and other grade materials 37 about the vault 1.

Internal of box 10, at a distance above bottom 12, a removable floor 16 (FIG. 2) is suspended from walls 14 by brackets 18 attached to walls 14. Although a floor of multiple segments would be easier to manipulate, it would be evident to one skilled in the art that floor 16 could be of single or multiple unit construction or that floor 16 could be hingedly (not shown) attached to at least one wall 14 while suspended on brackets 18 on the remaining walls 14. Floor 16 could also be fully removable from the interior of box 1, suspended, solely, on brackets 18. A utilities stowage chamber 20 is formed in the space between bottom 12 and floor 16, with floor 16 providing protection to cables entering the vault into utilities chamber 20. Floor 16 also acts to keep dirt and debris from accumulating around the cable in utilities chamber 20. At least one utilities port 22 penetrates through at least one wall 14, proximate the bottom of wall 14, thereby allowing passage of utilities lines into utilities chamber 20 from the exterior of vault 1. Typically, at least two utilities ports are provided, allowing ingress and egress of utilities lines. A step/seat 24 extends along the interior length of one wall 14, providing a step for ingress into box 10, as well as a seat while performing work within box 10. Like floor 16, step/seat 24 is suspended on brackets 18 affixed to walls 14, or could be hingedly (not shown) attached to wall 14.

The lid 30 is hingedly attached to an upper edge of a wall 14 by a full length stainless steel hinge such that it completely covers box 10 and the appendage 13 when in the closed position, extending beyond the top of the opposite wall 14. A gasket 32 surrounds the perimetric edge of lid 30, such that a compressive seal is formed between lid 30 and the top of each of the walls 14. Gasket 32 is formed of a compressive material, such as, but not limited to, neoprene. The placement of gasket 32 into the lower surface of lid 30, as opposed to the upper surface of walls 14, provides an added protection of the gasket 32 from accumulations of dirt, grime and debris and from the wear and tear of rubbing by workers and/or equipment entering the vault 1.

A sealing surface 23, preferably made of metal or other suitable durable surface, positioned about the open side 21 of the container 10 as shown in FIGS. 1 and 8 provides a flat sealing surface for the gasket 32 to seal against. The container 10 also has a concrete lip 25 exteriorly adjacent the sealing surface 23 to provide protection to the sealing surface 23 and support for the lid 30 during use as shown in FIG. 8 to prevent the gasket 32 from being fully compressed when heavy objects such as vehicles press against the lid 30. Pneumatic pistons 34 offset the weight of lid 30, thereby assisting in the opening and closing of lid 30 without undue effort. Lid 30 is typically hinged along the wall 14 adjacent step/seat 24.

The lid 30 as shown throughout the Figures is preferably molded out of fiberglass with interspaced layers of balsa wood to decrease the weight of the lid while providing a lid 30 that is capable of withstanding high amounts of localized pressure on the lid 30 when in a closed position. The vault 1 of the claimed invention is typically utilized in pedestrian traffic areas where the box 10 is placed below ground level and the lid 30 is placed flush with the surface of the ground. FIG. 9 illustrates an application of the vault 1 wherein during installation, the box 10 is positioned within the ground such that the lid 30 will be flush with the surface of a sidewalk 35 when the sidewalk 35 is poured around the vault 1 during construction. Many city, state and federal government codes and ordinances require lids of this type to meet an ASTM A-16 or AASHTO H-20 load rating before utilization in applications of this type so that heavy objects such as fire trucks may drive across the lid 30 without failure of the lid 30. The ASTM A-16 load rating requires a surface to withstand 20,000 pounds of localized force over a 10-inch by 10-inch area at the middle of the surface. The exterior surface of the lid 30 is slightly domed as shown in FIG. 9 (exaggerated for illustrative purposes) to direct rainwater and other fluids falling on the lid toward the drain channels 19 that drain the rainwater into the gravel and other grade materials 37 below the surface of the ground such as the sidewalk 35 illustrated in FIG. 9. The exterior surface of the lid 30 is also covered with a hardened mineral coating to provide a skid resistant surface with increased wear resistance.

Figure 5:
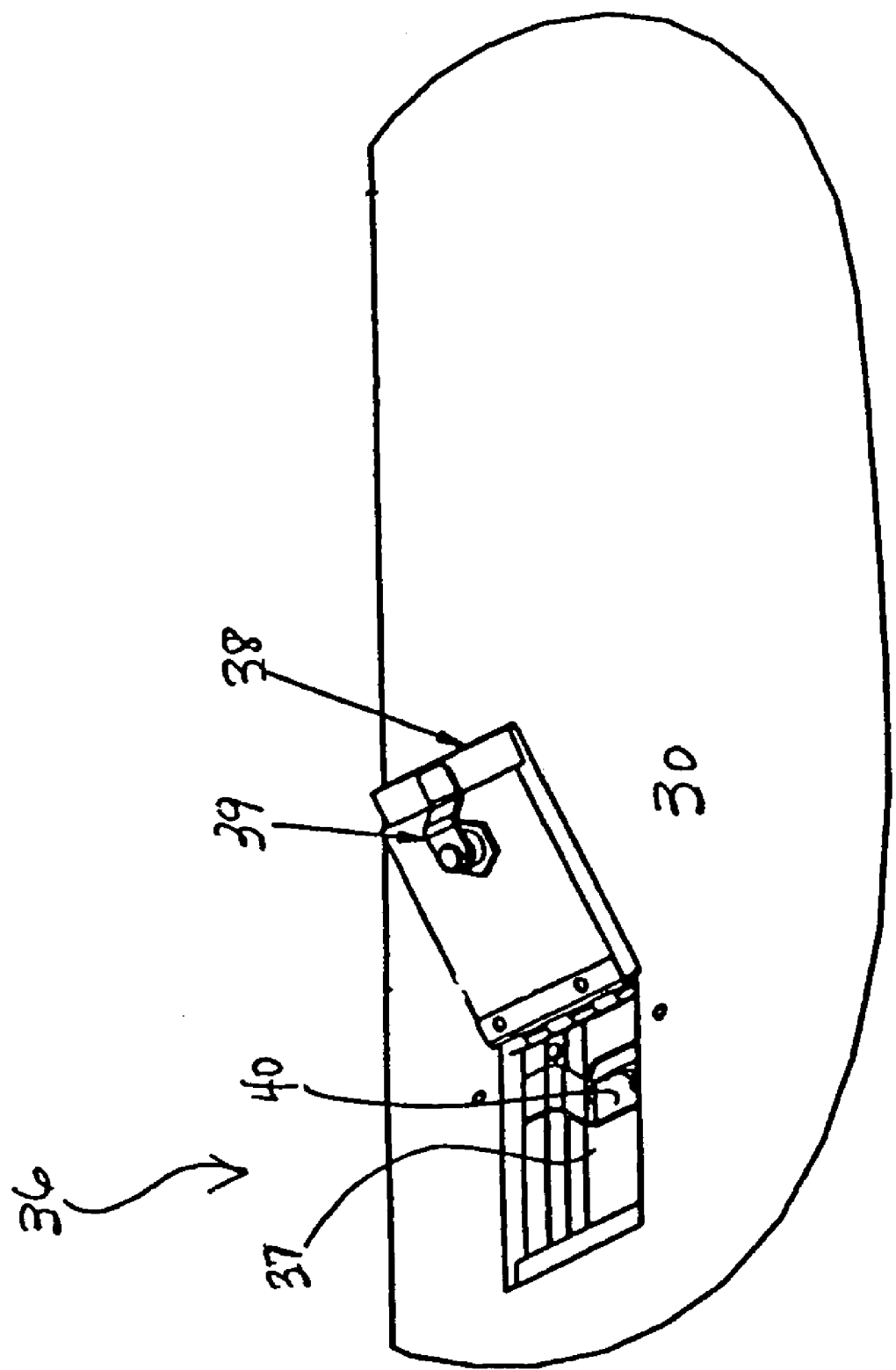
FIG. 5 is a perspective view of a portion of the upper surface of the lid of the present invention showing the recessed portion of the locking system.

A locking system cavity 36 is recessed into the upper surface of lid 30 as shown in FIGS. 5 and 6. The locking system cavity 36 has a lockable cover 38 covering a handle 31 operating vault hardware 33 located within the locking mechanism tray 17 of the appendage 13. The handle 31 may be padlocked (not shown) to prevent unauthorized entry into the box 10. This double locking system provides added security to vault 1 over that which would be afforded by a single lock.

In a preferred embodiment, a perimetric frame 41 extends upwardly from the top of the walls 14, surrounding lid 30, thereby providing a defined perimeter of the top of vault 1 relative to surrounding surfaces. The perimetric frame 41 is used during installation of the vault 1 to prevent grade materials such as concrete, gravel and dirt from entering the vault. The perimetric frame is preferably made of plastic, but may be made of a variety of other materials to accomplish the same objective.

A venting system 50 (FIG. 7) extends through the wall 14a of box 10 proximate the top of wall 14 opposite the hinge of lid 30. The extension of lid 30 beyond wall 14 provides protection of venting system 30 from the intake of water from above. A variety of venting systems are known in the art, including U.S. Pat. No. 6,016,828, issued to the present inventor on Jan. 26, 2000, which would be suitable for use in the present invention.

Connections for utilities like, but not limited to, electrical, CATV, and phone lines are facilitated by a wiring frame 60 (FIG. 4) which hingedly folds down into the confines of box 10 when in the closed position, and up into a substantially vertical position for use. Wiring frame 60 is mounted parallel to and proximate side 14 opposite the hinge of lid 30 such that when both lid 30 and wiring frame 60 are in the open position, they extend upwardly from each of two opposite sides 14. Once again, there are a variety of wiring frames known in the art, and, while the purpose of the present invention is to enclose the wiring frame, the frame itself is not deemed to be an integral part of the invention. Therefore, no further discussion of the specifics of the frame will be made. The box also has imbedded threaded inserts 26 inside to allow simple bolt-on installation of components within the interior of the box 10.

In the interest of public safety, safety barriers are incorporated into the design of vault 1. A pair of safety barrier arms 42 (FIG. 4) are hingedly attached, one at each end, to lid 30 such that when lid 30 is in the open position and wiring frame 60 is in the open position, the safety barrier arms may be extended between lid 30 and wiring frame 60, thereby providing a barrier above each of the four sides 14. A safety barrier arm bracket 62 at each end of wiring frame 60 receives the free end of each safety barrier arm 42 when the safety barrier arms 42 are extended.

Lifting points 70 (FIGS. 1 & 4) are formed in the exterior surface of each or at least two of the four walls 14 to facilitate connection of a lifting device, such as a crane, for movement of vault 1 from place to place and for lowering vault 1 into its installing position. Lifting points 70 would typically be a metal loop extending from the surface of wall 14, or other installation, many of which are known in the art.

It is to be understood that the present invention is not limited to the embodiments described above, but encompasses any and all embodiments within the scope of the following claims.

What is claimed is:

1. A flush to grade utilities vault for housing utilities, the vault comprising:
   a flared base container having a bottom and at least one open side;
   a movable floor suspended above the bottom of the container providing a utilities chamber between the floor and the bottom of the container;
   a utility port through a wall of the container in communication with the utilities chamber;
   a utility mount positioned above the floor for mounting a utility thereon;
   a vent system for venting gasses within the container;
   a lid sized and shaped to cover the open side of the container having a gasket positioned to provide a seal between the lid and the open side of the container when the lid is in a closed position; and
   a safety barrier arm for preventing closure of the lid.

2. The vault of claim 1 further comprising a piston mounted within the container and connected to the lid providing assistance in opening the lid.

3. The vault of claim 2 further comprising a step mounted within the vault for aiding in descent into and ascent from the vault.

4. The vault of claim 3 further comprising a locking system recessed within the lid for securing the lid to the container.

5. The vault of claim 1 wherein the lid has a domed exterior surface for directing fluids away from the lid.

6. The vault of claim 5 further comprising a plurality of drain channels about the open side of the container directing fluids directed from the lid away from the open side of the container.

7. The vault of claim 6 further comprising a baffler panel adjacent the open side of the container preventing grade materials from entering the container during installation.

8. A concrete flush to grade utilities vault for housing utilities having a reinforced fiberglass lid providing an ASTM A-16 load rating and a movable suspended floor providing a utilities chamber within the vault beneath the floor.

9. The vault of claim 8 wherein the lid has a domed exterior surface for directing fluids away from the lid.

10. The vault of claim 9 further comprising a plurality of drain channels about the container directing fluids directed from the lid away from the container.

11. The vault of claim 10 wherein the fiberglass lid has an exterior skid resistant surface covered with a hardened mineral coating providing increased resistance to surface wear.

12. The vault of claim 11 further comprising a locking system recessed within the lid for securing the lid to the vault.

13. The vault of claim 10 further comprising a flared base about the vault providing resistance to movement of the vault after installation.

14. The vault of claim 13 further comprising a utilities frame hingedly mounted within the vault opening oppositely from the lid.

15. A flush to grade utilities vault for housing utilities, the vault comprising:
- a container having a bottom and at least one open side;
- a lid hingedly mounted to one side of the container sized and shaped to cover the open side of the container having a gasket positioned to provide a seal between the lid and the open side of the container when the lid is in a closed position;
- a utilities frame hingedly mounted within the container to a side opposite the hinged mounting of the lid, the frame swingable out of the container in a direction opposite the lid when the lid is in an open position; and
- a safety barrier arm hingedly mounted to the utilities frame swingable toward and connectable to the lid when the lid is in an open position, the safety barrier arm preventing entrance to the container during use.

16. The vault of claim 15 further comprising a flared base about the container providing resistance to movement of the vault during use.

17. The vault of claim 16 further comprising a barrier panel adjacent the open side of the container preventing grade materials from entering the container during installation.

18. The vault of claim 17 further comprising a movable floor suspended above the bottom of the container providing a utilities chamber between the floor and the bottom of the container.

19. A flush to grade utilities vault for housing utilities, the vault comprising:
- a container having at least one open side with a sealing surface about the open side;
- an appendage connected to and outside of the container, the appendage having a locking mechanism tray outside of the container;
- a lid sized and shaped to cover the open side of the container and the locking mechanism tray, the lid having a gasket positioned to seal against the sealing surface about the open side of the container; and
- a locking mechanism having a first portion within the locking mechanism tray and a second portion recessed within the lid, above the appendage.

20. The vault of claim 19, further comprising a flared base about the container.

21. The vault of claim 20, further comprising a movable suspended floor.

22. The vault of claim 19, wherein the lid has a domed exterior surface.

23. The vault of claim 22, further comprising a plurality of drain channels about the open side of the container.

* * * * *